United States Patent
Segawa et al.

(10) Patent No.: US 12,306,576 B2
(45) Date of Patent: May 20, 2025

(54) ELECTROCONDUCTIVE MEMBER, PROCESS CARTRIDGE, AND DEVICE FOR FORMING ELECTROPHOTOGRAPHIC IMAGE

(71) Applicant: CANON KABUSHIKI KAISHA, Tokyo (JP)

(72) Inventors: Shota Segawa, Shizuoka (JP); Hirobumi Takahashi, Shizuoka (JP); Yasuhiro Fushimoto, Kanagawa (JP); Syoji Inoue, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 651 days.

(21) Appl. No.: 17/655,870

(22) Filed: Mar. 22, 2022

(65) Prior Publication Data

US 2022/0229376 A1 Jul. 21, 2022

Related U.S. Application Data

(63) Continuation of application No. PCT/JP2020/039033, filed on Oct. 16, 2020.

(30) Foreign Application Priority Data

Oct. 18, 2019 (JP) .................. 2019-191552

(51) Int. Cl.
*G03G 5/10* (2006.01)
*C08K 3/04* (2006.01)
(Continued)

(52) U.S. Cl.
CPC ............... *G03G 5/104* (2013.01); *C08K 3/04* (2013.01); *C08K 3/22* (2013.01); *C08K 5/098* (2013.01);
(Continued)

(58) Field of Classification Search
CPC ........ G03G 5/104; G03G 15/751; C08K 3/04; C08K 3/22; C08K 5/098; C08K 2003/2296; C08K 2201/001; C08L 9/06
See application file for complete search history.

(56) References Cited

U.S. PATENT DOCUMENTS

| | | | |
|---|---|---|---|
| 4,043,658 A | 8/1977 | Inoue et al. | |
| 4,495,264 A | 1/1985 | Takahashi et al. | |

(Continued)

FOREIGN PATENT DOCUMENTS

| | | | |
|---|---|---|---|
| CN | 104662482 A | 5/2015 | |
| CN | 107229204 A | 10/2017 | |

(Continued)

OTHER PUBLICATIONS

English machine translation of the description of JP-2003105119-A (Year: 2003).*

(Continued)

*Primary Examiner* — Mark F. Huff
*Assistant Examiner* — Boone Alexander Evans
(74) *Attorney, Agent, or Firm* — VENABLE LLP

(57) ABSTRACT

The electrophotographic electroconductive member includes a support having an electroconductive outer surface, and an electroconductive layer on the surface of the support. The electroconductive layer has a matrix containing a crosslinked product of a first rubber, and domains dispersed in the matrix, and the domains each contain a crosslinked product of a second rubber and electroconductive particles. The matrix has a volume resistivity R1 of more than $1.0 \times 10^{12}$ Ω·cm, and the domains each have a volume resistivity R2 lower than the volume resistivity R1 of the matrix. The electroconductive layer further has a pore, and an inner wall of the pore is constituted by a part of the matrix and a part of the domains. The domains constituting (Continued)

the inner wall protrude into the pore at sites on the inner wall.

9 Claims, 2 Drawing Sheets

(51) Int. Cl.
   *C08K 3/22* (2006.01)
   *C08K 5/098* (2006.01)
   *C08L 9/06* (2006.01)
   *G03G 15/00* (2006.01)

(52) U.S. Cl.
   CPC .............. *C08L 9/06* (2013.01); *G03G 15/751* (2013.01); *C08K 2003/2296* (2013.01); *C08K 2201/001* (2013.01)

(56) References Cited

U.S. PATENT DOCUMENTS

| | | | |
|---|---|---|---|
| 4,551,404 A | 11/1985 | Hiro et al. | |
| 4,615,963 A | 10/1986 | Matsumoto et al. | |
| 4,615,965 A | 10/1986 | Matsumoto et al. | |
| 4,717,636 A | 1/1988 | Takahashi et al. | |
| 5,897,248 A | 4/1999 | Schlueter | |
| 7,171,142 B2 | 1/2007 | Kawakami et al. | |
| 9,983,516 B2 | 5/2018 | Takahashi et al. | |
| 10,558,149 B2 | 2/2020 | Takahashi et al. | |
| 11,169,454 B2 | 11/2021 | Nishioka et al. | |
| 11,307,509 B2 | 4/2022 | Hino et al. | |
| 2001/0026709 A1 | 10/2001 | Hara | |
| 2002/0022142 A1 | 2/2002 | Harada | |
| 2003/0067520 A1 | 4/2003 | Inoue | |
| 2005/0202946 A1* | 9/2005 | Hattori | G03G 5/0525 |
| | | | 29/895.32 |
| 2013/0164051 A1 | 6/2013 | Ageishi | |
| 2017/0102633 A1 | 4/2017 | Yoshidome | |
| 2017/0277060 A1 | 9/2017 | Kamijo | |
| 2020/0150552 A1* | 5/2020 | Shindo | C08K 3/04 |
| 2021/0026295 A1* | 1/2021 | Yamada | G03G 15/0812 |
| 2021/0373448 A1 | 12/2021 | Fushimoto et al. | |
| 2022/0011684 A1 | 1/2022 | Nishioka et al. | |

FOREIGN PATENT DOCUMENTS

| | | |
|---|---|---|
| JP | 2-244176 A | 9/1990 |
| JP | 7-36296 A | 2/1995 |
| JP | 2001-254022 A | 9/2001 |
| JP | 2002-3651 A | 1/2002 |
| JP | 2003105119 A * | 4/2003 |
| JP | 2005-222727 A | 8/2005 |
| JP | 2008-107845 A | 5/2008 |
| JP | 2009-139866 A | 6/2009 |
| JP | 2012-27132 A | 2/2012 |
| JP | 2013-134262 A | 7/2013 |
| JP | 2017-72833 A | 4/2017 |
| JP | 2017-198827 A | 11/2017 |
| JP | 2019-117230 A | 7/2019 |

OTHER PUBLICATIONS

U.S. Appl. No. 17/655,228, Hirobumi Takahashi, filed Mar. 17, 2022.

* cited by examiner

ELECTROCONDUCTIVE MEMBER, PROCESS CARTRIDGE, AND DEVICE FOR FORMING ELECTROPHOTOGRAPHIC IMAGE

CROSS-REFERENCE TO RELATED APPLICATIONS

This application is a Continuation of International Patent Application No. PCT/JP2020/039033, filed Oct. 16, 2020, which claims the benefit of Japanese Patent Application No. 2019-191552, filed Oct. 18, 2019, both of which are hereby incorporated by reference herein in their entirety.

BACKGROUND

Technical Field

The present disclosure is directed to an electrophotographic electroconductive member, a process cartridge, and an electrophotographic image forming apparatus.

Description of the Related Art

In an electrophotographic image forming apparatus, an electrophotographic electroconductive member is used as each of a charging member and a transfer member. As the electrophotographic electroconductive member, there is known an electrophotographic electroconductive member including an electroconductive support and an electroconductive on the support. The electrophotographic electroconductive member serves to give a charge to an abutting object through discharge or triboelectric charging by transporting the charge from the electroconductive support to a surface of the electrophotographic electroconductive member. The charging member is a member configured to cause discharge between itself and an electrophotographic photosensitive member to charge a surface of the electrophotographic photosensitive member. In addition, the transfer member is a member configured to transfer a developer from the electrophotographic photosensitive member onto a printing medium or an intermediate transfer member, and also to cause discharge to stabilize the transferred developer.

In Japanese Patent Application Laid-Open No. 2002-3651, there is a disclosure of an electrophotographic electroconductive member formed from a rubber composition having a sea-island structure including a polymeric continuous phase formed of an ionic electroconductive rubber material, and a polymeric particle phase formed of an electronic electroconductive rubber material, wherein the ionic electroconductive rubber material is mainly formed from a raw material rubber A having a volume intrinsic resistivity of $1 \times 10^{12}$ Ω·cm or less, and wherein the electronic electroconductive rubber material is made electroconductive by blending electroconductive particles into a raw material rubber B.

In forming an electrophotographic image by using the electrophotographic electroconductive member described in Japanese Patent Application Laid-Open No. 2002-3651 as a charging member, the inventors tried setting a charging bias between the charging member and an electrophotographic photosensitive member to be higher than a general value in order to obtain a high-contrast electrophotographic image. When the formation of an electrophotographic image was performed over a long period of time under such state, an increase in hardness of the electrophotographic electroconductive member was recognized. The increase in hardness of the charging member reduces an abutting nip width between the charging member and the electrophotographic photosensitive member, and hence a sufficient discharge amount cannot be secured in some cases. As a result, a horizontal streak-like abnormal image resulting from a charging failure occurs in some cases.

In addition, also when the electrophotographic electroconductive member according to Japanese Patent Application Laid-Open No. 2002-3651 is applied to a transfer member, the hardness of the electrophotographic electroconductive member is increased, and hence a sufficient discharge amount cannot be secured. As a result, toner cannot be sufficiently transferred from the electrophotographic photosensitive member onto paper, leading to a reduction in image density or a blank spot in part of the image in some cases.

SUMMARY

At least one aspect of the present disclosure is directed to providing an electrophotographic electroconductive member that is suppressed from undergoing an increase in hardness even when used over a long period of time under a state in which an applied voltage is increased.

Another aspect of the present disclosure is directed to providing a process cartridge conducive to stable formation of a high-quality electrophotographic image.

Still another aspect of the present disclosure is directed to providing an electrophotographic image forming apparatus capable of stably forming a high-quality electrophotographic image.

According to one aspect of the present disclosure, there is provided an electrophotographic electroconductive member including: a support having an electroconductive outer surface; and an electroconductive layer on the outer surface of the support, wherein the electroconductive layer has: a matrix containing a crosslinked product of a first rubber; and domains dispersed in the matrix, the domains each contain: a crosslinked product of a second rubber; electroconductive particles, the matrix has a volume resistivity R1 of more than $1.0 \times 10^{12}$ Ω·cm, and the domains each have a volume resistivity R2 lower than the volume resistivity R1 of the matrix, the electroconductive layer further has a pore, an inner wall of the pore is constituted by a part of the matrix and a part of the domains, and the domains constituting the inner wall protrude into the pore at sites on the inner wall.

According to another aspect of the present disclosure, there is provided an electrophotographic image forming apparatus including the electrophotographic electroconductive member.

According to still another aspect of the present disclosure, there is provided an electrophotographic process cartridge, which is detachably attachable to a main body of an electrophotographic image forming apparatus, the process cartridge including the electrophotographic electroconductive member.

Further features of the present disclosure will become apparent from the following description of exemplary embodiments with reference to the attached drawings.

DESCRIPTION OF THE EMBODIMENTS

Figure 1:
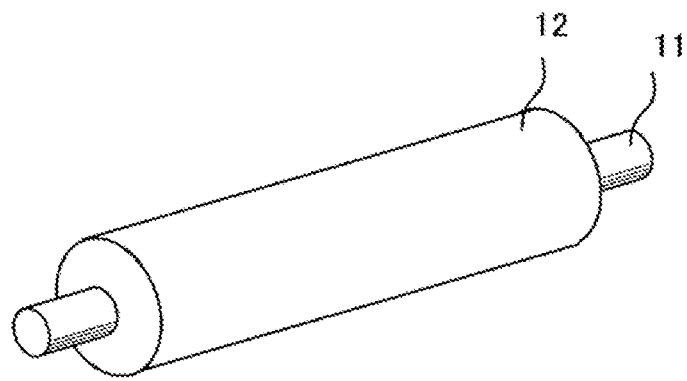
FIG. 1 is a schematic view of the entirety of an electrophotographic electroconductive member according to one aspect of the present disclosure.

The inventors conceive that the reason why the hardness of the electrophotographic electroconductive member is increased is as described below when the electrophotographic electroconductive member according to Japanese Patent Application Laid-Open No. 2002-3651 is used in the formation of an electrophotographic image over a long period of time under a state in which an applied voltage is increased.

When the electrophotographic electroconductive member is placed in an energized state in an electrophotographic image forming apparatus over a long period of time, a polymer radical is generated in the electrophotographic electroconductive member. The polymer radical becomes a polymer peroxide radical via oxygen to generate polymer radicals in a chain reaction. When radicals are bonded to each other to form a crosslink as a termination reaction, the hardness of the electrophotographic electroconductive member is increased. Now, the charging member described in Japanese Patent Application Laid-Open No. 2002-3651 includes electroconductive domains and an electroconductive matrix. It is conceived that, at the time of energization through application of a voltage, such reaction of radicals as described above occurs to deteriorate polymers forming the domains and the matrix, leading to an increase in hardness of the electrophotographic electroconductive member.

In view of the foregoing, the inventors have made investigations with a view to suppressing a temporal increase in hardness by suppressing the deterioration of polymers. As a result, the inventors have found that an electrophotographic electroconductive member having the following configuration is effective for the prevention of the increase in hardness through suppression of the deterioration of polymers.

That is, an electrophotographic electroconductive member according to one aspect of the present disclosure includes: a support having an electroconductive outer surface; and an electroconductive layer on the outer surface of the support.

The electroconductive layer has: a matrix containing a crosslinked product of a first rubber; and domains dispersed in the matrix.

The domains each contain: a crosslinked product of a second rubber; and electroconductive particles.

The matrix has a volume resistivity R1 of more than $1.0 \times 10^{12}$ Ω·cm, and the domains each have a volume resistivity R2 lower than the volume resistivity R1 of the matrix.

In addition, the electroconductive layer further has a pore, an inner wall of the pore is constituted by a part of the matrix and a part of the domains, and the domains constituting the inner wall protrude into the pore at sites on the inner wall.

The above-mentioned configuration is described in detail below.

The electroconductive layer has a structure in which the domains containing the electroconductive particles are surrounded by the matrix having a high resistance of more than $1.0 \times 10^{12}$ Ω·cm. Thus, the migration of a charge in the matrix is suppressed. Accordingly, when a high voltage is applied to the support, an electric field is concentrated on the domains. In the inner wall of the pore, the electric field is concentrated on the domains protruding into the pore, and hence discharge occurs between the domains protruding into the same pore. Such discharge successively occurs between the domains protruding in the same pore, and thus a charge migrates in the pore toward the surface side of the electroconductive layer. The charge that has reached the surface side of the electroconductive layer in the pore then passes through the resin in the electroconductive layer to migrate to the wall surface of another pore on a side closer to the surface of the electroconductive layer. Then, discharge occurs again in the next pore, and the charge migrates to the electroconductive layer surface side in the pore. By repeating this, the charge reaches from the electroconductive support to the outermost surface of the electroconductive layer (surface of the electroconductive layer on the opposite side to its side opposed to the support). In this manner, in the electrophotographic electroconductive member according to the present disclosure, the charge can be caused to flow from the support side toward the outermost surface of the electroconductive layer through the inside of the pores. Accordingly, the amount of a current flowing through a non-pore portion, that is, a solid portion of the electroconductive layer can be reduced. As a result, the deterioration of a polymer present in the solid portion can be suppressed, and hence a temporal increase in hardness can be prevented.

The amount of a current in the pore may be controlled based on, for example, a distance between the domains protruding into the pore, the volume of the pore, and the resistance of each of the domains.

An electrophotographic electroconductive member of a roller shape (hereinafter sometimes referred to as "electroconductive roller") is described as an electrophotographic electroconductive member according to one aspect of the present disclosure, but the electrophotographic electroconductive member according to the present disclosure is not limited to this aspect.

FIG. 1 is a perspective view of the electroconductive roller according to one aspect of the present disclosure, which includes an electroconductive support 11 of a columnar shape or a hollow cylindrical shape, and an electroconductive layer 12 formed on the outer periphery of the support.

Figure 2:
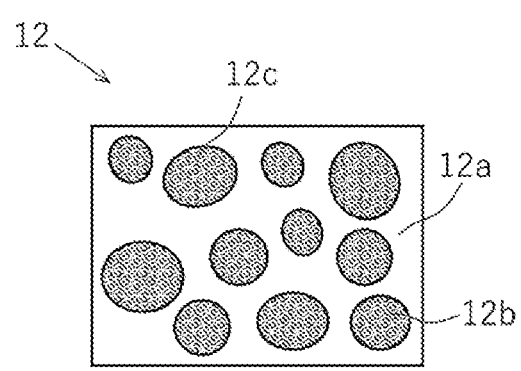
FIG. 2 is a cross-sectional view of an electroconductive layer in a direction perpendicular to the longitudinal direction of the electrophotographic electroconductive member according to one aspect of the present disclosure.

FIG. 2 is a cross-sectional view of the electroconductive layer in a direction perpendicular to the longitudinal direction of the electroconductive roller according to the present disclosure. The electroconductive layer 12 has a phase-separated structure of a sea-island type (hereinafter referred to as "matrix-domain structure") formed of a matrix 12a serving as a sea region and domains 12b serving as island regions. In addition, the electroconductive layer 12 has a feature in that electroconductive particles 12c are localized in the domains 12b.

<Electroconductive Support>

The electroconductive support 11 is preferably made of a metal, such as aluminum, an aluminum alloy, stainless steel, or iron. In addition, in order to improve corrosion resistance or abrasion resistance, those metals may each be subjected to plating treatment with chromium, nickel, or the like. The shape of the electroconductive support 11 may be any one of a hollow shape or a solid shape, and its outer diameter may be appropriately selected in relation to an electrophotographic image forming apparatus onto which the electroconductive roller is to be mounted, and for example, may generally fall within the range of from 4 mm to 10 mm.

<Electroconductive Layer>
<Matrix>

The matrix contains the crosslinked product of the first rubber. The volume resistivity R1 of the matrix is more than $1.0\times10^{12}$ Ω·cm.

By virtue of setting R1 to more than $1.0\times10^{12}$ Ω·cm, the migration of a charge in the matrix can be suppressed, and hence an electric field can be concentrated on the domains. Consequently, discharge between the protruding domains in the pore can be caused to occur.

<First Rubber>

The first rubber for constituting the matrix is not particularly limited as long as the rubber can undergo phase separation with the second rubber to be described later to form the matrix-domain structure, and can also form the domains protruding into the pore. The first rubber is finally vulcanized to become a crosslinked product, and hence the expression "crosslinked product of the first rubber" is used, but the expression "first rubber" is sometimes used for simplicity, including the stage of a composition. The same applies to the "second rubber".

Preferred examples of such first rubber as described above may include a natural rubber (NR), an isoprene rubber (IR), a butadiene rubber (BR), a styrene-butadiene rubber (SBR), a butyl rubber (IIR), an ethylene-propylene rubber (EPM), an ethylene-propylene-diene terpolymer rubber (EPDM), a chloroprene rubber (CR), and a silicone rubber.

In addition, reinforcing carbon black may be blended into the matrix as a reinforcing agent to the extent that the electroconductivity of the matrix is not affected. Examples of the reinforcing carbon black to be used in this case may include FEF, GPF, SRF, and MT carbon each having low electroconductivity.

Further, a filler, a processing aid, a vulcanization aid, a vulcanization accelerator, a vulcanization accelerator aid, a vulcanization retarder, an age resistor, a softening agent, a dispersant, a colorant, or the like, which is generally used as a blending agent for a rubber, may be added to the first rubber for constituting the matrix as required.

<Domains>

The volume resistivity R2 of each of the domains is lower than the volume resistivity R1 of the matrix. The domains in the present disclosure are electroconductive, and each contain the crosslinked product of the second rubber and the electroconductive particles. R2 is preferably $1.0\times10^1$ Ω·cm or more and $1.0\times10^4$ Ω·cm or less. When R2 is $1.0\times10^4$ Ω·cm or less, electroconductivity sufficiently high with respect to the electroconductivity of the matrix is obtained, and hence a charge can be more effectively accumulated in the domains. Accordingly, the migration of the charge in the pore can be more effectively carried out. In addition, R2 is preferably $1.0\times10^1$ Ω·cm or more from the viewpoint of the prevention of a current leaking from the surface of the electrophotographic electroconductive member to a photosensitive member during use of the electrophotographic electroconductive member as a transfer member or a charging member in an electrophotographic image forming apparatus.

<Second Rubber>

The second rubber is not particularly limited as long as the rubber can undergo phase separation with the first rubber to form the matrix-domain structure, and can also form the domains protruding into the pore.

Preferred examples of such second rubber as described above may include NR, IR, BR, SBR, IIR, EPM, EPDM, CR, an acrylonitrile-butadiene rubber (NBR), a hydrogenated acrylonitrile-butadiene rubber (H-NBR), an epichlorohydrin rubber (ECO), and a silicone rubber given as the examples of the first rubber, and a urethane rubber (U). A rubber that undergoes phase separation with the first rubber is selected therefrom and used.

<Electroconductive Particles>

Examples of the electroconductive particles to be blended in the domains include electronic electroconductive agents including: carbon materials, such as electroconductive carbon black and graphite; oxides, such as titanium oxide and tin oxide; metals, such as Cu and Ag; and particles that are made electroconductive through coating of their surfaces with the oxide or the metal. In addition, two or more kinds of those electroconductive particles may be used by being blended in appropriate amounts as required.

Of such electroconductive particles as described above, electroconductive carbon black is preferred for reasons, such as having high efficiency in electroconductivity impartment, having high affinity for rubber, having a high reinforcing effect, and facilitating the control of a distance between the electroconductive particles. The kind of the electroconductive carbon black to be blended in the domains is not particularly limited. Specific examples thereof include gas furnace black, oil furnace black, thermal black, lamp black, acetylene black, and ketjen black.

Of those, carbon black having a DBP absorption of 50 $cm^3/100$ g or more and 200 $cm^3/100$ g or less may be suitably used from the viewpoint of a reinforcing property because it is useful to make the domains hard in the formation of the domains protruding into the pore to be described later. The DBP absorption ($cm^3/100$ g) refers to the volume of dibutyl phthalate (DBP) to which 100 g of carbon black can adsorb, and is measured in accordance with JIS K 6217. In general, carbon black has a tufted higher-order structure in which primary particles having an average particle diameter of 10 nm or more and 50 nm or less are aggregated. The tufted high-order structure is called "structure", and the degree thereof is quantified by the DBP absorption ($cm^3/100$ g). In general, carbon black with a developed structure has a high reinforcing property for rubber.

<Measurement Method for Volume Resistivity of Matrix>

The volume resistivity of the matrix may be measured by, for example, cutting a thin section with a predetermined thickness (e.g., 1 μm) including the matrix-domain structure out of the electroconductive layer, and bringing a microprobe of a scanning probe microscope (SPM) or an atomic force microscope (AFM) into contact with the matrix in the thin section.

With regard to the cutting of the thin section out of the elastic layer, for example, the thin section is cut out so as to include at least part of a cross-section parallel to an XZ plane in the case where the longitudinal direction of the electrophotographic electroconductive member is set as an X-axis, the thickness direction of the electroconductive layer is set as a Z-axis, and the circumferential direction of the electroconductive layer is set as a Y-axis. Alternatively, the thin section is cut out so as to include at least part of a YZ plane perpendicular to the axial direction of the electrophotographic electroconductive member. Examples of means for cutting out the thin section include a sharp razor, a microtome, and a focused ion beam (FIB).

The measurement of the volume resistivity is performed as described below. One surface of the thin section cut out of the electroconductive layer is grounded. Then, a microprobe of a scanning probe microscope (SPM) or an atomic force microscope (AFM) is brought into contact with the matrix portion of the surface of the thin section on the opposite side to its grounded surface, and a DC voltage of 50 V is applied for 5 seconds. Then, an arithmetic average value is calculated from values obtained by measuring a ground current value for 5 seconds, and the applied voltage is divided by the calculated value to calculate an electrical resistance value. Finally, the resistance value is converted into the volume resistivity through use of the thickness of the thin section. Here, the SPM and the AFM are each also capable of measuring the thickness of the thin section at the same time with the resistance value.

The value of the volume resistivity of the matrix in a charging member of a columnar shape is determined, for example, by: cutting one thin section sample out of each of regions obtained by dividing the electroconductive layer into four parts in its circumferential direction and five parts in its longitudinal direction; obtaining the above-mentioned measurement value; and then calculating the arithmetic average value of the volume resistivities of a total of 20 samples.

<Measurement Method for Volume Resistivity of Domains>

It is appropriate that the measurement of the volume resistivity of each of the domains be performed by the same method as in the foregoing section <Measurement Method for Volume Resistivity of Matrix> except that: the measurement sites are changed to sites corresponding to the domain; and the applied voltage in the measurement of the current value is changed to 1 V.

<Identification Method for Matrix-Domain Structure>

It is appropriate that the identification of the matrix-domain structure be performed as described below. Specifically, it is appropriate that a thin section of the electroconductive layer be produced from the electrophotographic electroconductive member and subjected to detailed observation. Examples of means for cutting out the thin section include a sharp razor, a microtome, and a FIB. In addition, in order to suitably observe the matrix-domain structure, pretreatment, such as dyeing treatment or vapor deposition treatment, which enables the contrast between the electroconductive phase and the insulating phase to be suitably obtained, may be performed. The thin section subjected to formation of a fracture surface and the pretreatment may be observed with a laser microscope, a scanning electron microscope (SEM), or a transmission electron microscope (TEM).

<Distance Between Adjacent Domains (Hereinafter Sometimes Referred to as "Interdomain Distance")>

An interdomain distance preferably falls within the range of from 0.3 μm or more to 5.0 μm or less.

In order to carry out charge migration between pores, the interdomain distance is preferably 5.0 μm or less, particularly preferably 3.0 μm or less. Meanwhile, in order to reliably separate the domains from each other by an insulation region, to thereby promote discharge between the domains protruding into the pore, the interdomain distance is set to preferably 0.3 μm or more, particularly preferably 0.5 μm or more.

•Measurement Method for Interdomain Distance

It is appropriate that the measurement of the interdomain distance be performed as described below.

First, a slice is produced by the same method as the above-mentioned method in the measurement of the volume resistivity of a matrix. Then, a thin section having a cross-section of the elastic layer is cut out of the elastic layer by a method, such as a freeze fracture method, a cross polisher method, or a focused ion beam (FIB) method. The FIB method is preferred in consideration of the smoothness of the cross-section and the pretreatment for observation. In addition, in order to suitably observe the matrix-domain structure, pretreatment, such as dyeing treatment or vapor deposition treatment, which enables the contrast between the electroconductive phase and the insulating phase to be suitably obtained, may be performed.

The resultant thin section is observed with a scanning electron microscope (SEM) or a transmission electron microscope (TEM) to identify the presence of the matrix-domain structure. Of those, from the viewpoint of accuracy in quantifying the area of the domains, a SEM is preferably used to perform observation at a magnification of from 1,000 times to 100,000 times.

The interdomain distance may be measured by quantifying the SEM image of the cross-section in which the matrix-domain structure appears. The SEM image is subjected to 8-bit gray scaling through use of image processing software (e.g., "Luzex" (product name, manufactured by Nireco Corporation)) to obtain a monochrome image with 256 levels of gray. Next, the white and black of the image are subjected to inversion processing so that the domain in the monochrome image becomes white. Thus, a binarized image is obtained. Then, the distance between a group of domains in the binarized image is calculated. The distance in this case is the shortest distance between domains in proximity to each other, and is calculated between the wall surfaces (boundaries between white and black) of domains in proximity to each other.

In the case of a transfer member of a columnar shape, when the length of the electroconductive layer in its longitudinal direction is represented by L, and the thickness of the electroconductive layer is represented by T, cross-sections of the electroconductive layer in its thickness direction are obtained at the following three sites: the center of the electroconductive layer in its longitudinal direction, and L/4 from both ends of the electroconductive layer toward the center. It is appropriate that, for each of the resultant cross-sections, a 50 μm square observation region be set at each of three random sites in a thickness region from the outer surface of the electroconductive layer to a depth of from 0.1 T to 0.9 T toward a support direction, and each interdomain distance observed in each of a total of nine observation regions be measured. A thin section is cut out in such a direction that a cross-section including a normal line whose starting point is the central axis of the support can be observed because a plane including the migration direction of a charge, i.e., from the support to the outer surface of the electroconductive layer needs to be observed.

<Pore>
<Porosity>

A porosity preferably falls within the range of from 30% or more to 90% or less. When the porosity is 30% or more, a sufficient space for energization can be secured. In addition, when the porosity is 90% or less, joining of the domains caused by foaming can be prevented, and hence discharge in the pore can be caused sufficiently.

<Measurement Method for Porosity>

A razor is applied to the foamed electroconductive layer of the electrophotographic electroconductive member to cut out a 2 mm square slice at each of five points in the longitudinal direction. Next, through use of an X-ray CT inspection apparatus (product name: TX-300, manufactured by Mars Tohken Solution Co., Ltd.), transmission images of the slices are measured at a resolution of 1 μm per pixel, and tomographic images are obtained therefrom to construct a three-dimensional image. The volume of closed pores (cells) is determined from the resultant three-dimensional image.

The ratio of the volume of the pores to the volume of the entirety of the three-dimensional image is defined as the porosity (%).

<Foaming Agent>

As a foaming agent to be incorporated into an unvulcanized rubber composition to form the pore in the electro-conductive layer, there are given azodicarbonamide, sodium hydrogen carbonate, and p,p'-oxybisbenzenesulfonylhydrazide ((4,4'-oxybisbenzenesulfonylhydrazide)).

Figure 3:
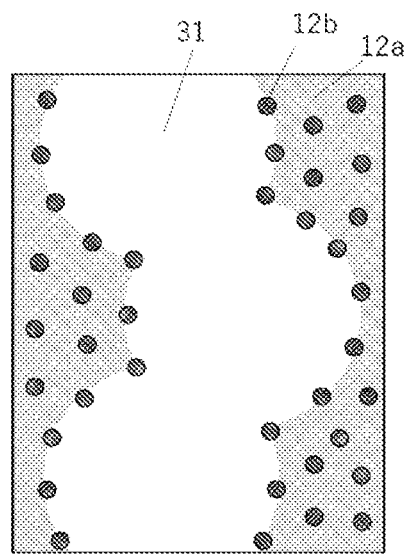
FIG. 3 is a cross-sectional view of an interface between the inner wall of a pore and a rubber crosslinked product in a cross-section of an electroconductive layer in a direction perpendicular to the longitudinal direction of an electroconductive roller according to the present disclosure.

FIG. 3 is an illustration of an interface between the inner wall of a pore and a rubber crosslinked product in a cross-section of the electroconductive layer in a direction perpendicular to the longitudinal direction of the electroconductive roller according to the present disclosure. The domains 12b in the matrix 12a protrude into a pore 31.

<Domains Protruding into Pore>

<Formation of Domains Protruding into Pore>

A method of causing the domains 12b to protrude into the pore 31 in the inner wall of the pore 31 is described. A rubber composition for matrix formation, a rubber having electroconductive particles dispersed therein (rubber composition for domain formation), and a vulcanizing agent, a chemical foaming agent, and the like are mixed and molded into an electroconductive tube. Then, foaming of the chemical foaming agent and vulcanization are performed in an oven. At this time, the rubber composition containing the chemical foaming agent is heated to generate a gas along with the decomposition of the foaming agent. The generated gas accumulates to push away the rubber, thus constituting an approximately spherical pore. Spherical pores are connected to each other to form an open-cell shape in some cases. At the time when the gas is generated to push away the rubber, in the case where the rubber has a difference in hardness, a hard part is harder to push away, and a soft part is easier to push away. Accordingly, the difference in hardness causes a difference in degree of being pushed away, thus forming unevenness on a spherical pore wall surface. That is, the domains 12b are hard, and the matrix 12a is soft, and hence a structure in which the domains 12b in the inner wall of the pore 31 protrude into the pore 31 can be obtained.

For the hardness regarding unevenness formation, for example, an MD-1 hardness may be referred to. The MD-1 hardness is a value measured with a microrubber hardness meter manufactured by Kobunshi Keiki Co., Ltd. (product name: MD-1 capa, type A). The shape of a pressing needle used in this case is a columnar shape having a height of 0.50 mm and a diameter of 0.16 mm. As a difference in this value between the matrix and each of the domains increases, unevenness is more remarkably formed. For example, a rubber composition for matrix formation and a rubber composition for domain formation each of which is free of the foaming agent and contains an arbitrary amount of the vulcanizing agent are each filled into a mold of a plate shape having a thickness of 2 mm, and pressed while being heated at the foaming temperature of the foaming agent, to produce each vulcanized rubber composition of a plate shape having a thickness of 2 mm. As a measurement method, such composition is subjected to measurement with the microrubber hardness meter, and its MD-1 hardness is calculated. A difference in MD-1 hardness between each of the domains and the matrix is preferably 30 or more. More specifically, it is preferred that the MD-1 hardness of each of the domains be 80 or more, and the MD-1 hardness of the matrix be 50 or less.

The hardness may be controlled based on the viscosity of the composition at the foaming temperature, and the kind and amount of a filler.

In order for the domains to each have a high hardness, it is desired that the domains each have a configuration in which the second rubber has a large Mooney viscosity and a large crosslinking degree, and contains a large amount of a filler. It is particularly desired that the domains be each highly filled with carbon black having a high reinforcing property. Specifically, it is preferred that the domains be each filled with carbon black having a DBP absorption of 50 $cm^3/100$ g or more and 200 $cm^3/100$ g or less so that the content thereof in the domain may be 60 mass % or more and 120 mass % or less with respect to all rubber components of the domain.

For the matrix, it is preferred that the first rubber be restricted to having a small Mooney viscosity, and containing a small amount of a filler or containing only a filler having a low reinforcing property. The Mooney viscosity is a Mooney viscosity ML(1+4) based on Japanese Industrial Standard (JIS) K6300-1:2013, and its unit is a Mooney unit (M).

<Identification of Domains Protruding into Pore>

A slice including a pore wall surface is cut out of the electroconductive layer. In this case, the slice includes the wall surface of the pore, and hence its shape is not a cube made up of 50 μm squares and lacks a pore portion. In addition, the slice is cut out so that the area of the pore wall surface in the slice may be 2,500 $μm^2$ or more. Then, cross-sections are cut out of the cut-out slice by FIB in a direction perpendicular to the pore wall surface at intervals of, for example, 10 nm. All the cross-sections are observed with a SEM at a magnification of from 10K times to 20K times. Images of the cross-sections are stacked together to construct a 50 μm square three-dimensional image. The resultant three-dimensional image is evaluated, for example, using analytical software (manufactured by The MathWorks, Inc., product name: "MATLAB (trademark) 2015b") as described below. First, the three-dimensional image is binarized using Otsu's method to create a three-dimensional binary image in which a rubber region and a pore region are separated. Further, a three-dimensional binary image separated into a domain region and a matrix+pore region is similarly created. The domain region, the matrix region, and the pore region are separated from each other by comparing the created three-dimensional binary image in which the rubber region and the pore region are separated, and the created three-dimensional binary image separated into the domain region and the matrix+pore region. Then, a three-dimensional image in which the domain region, the matrix region, and the pore region are arbitrarily color coded is created.

Next, from the resultant three-dimensional image, for one domain, a plane obtained by connecting points at each of which the matrix, the domain, and the pore are all brought into contact with each other is subjected to plane approximation by a least-squares method, and the resultant plane is set to be the bottom surface of the domain. When a domain protrudes on a pore side with respect to the bottom surface, the domain is defined as a domain protruding into the pore, and a region thereof present on the pore side with respect to the bottom surface is defined as a protruding portion.

Then, from the resultant three-dimensional image, distances between the protruding portions of the domains protruding into the pore are calculated for all the domains protruding into the pore that are present on the three-dimensional image. Herein, the distance between the protruding portions of the domains refers, with a focus on one of the domains protruding into the pore, to a distance (spatial distance) between the portion of the domain exposed in the pore and the portion of the spatially closest other domain exposed in the pore. In addition, 90% or more of the domains subjected to the measurement are preferably domains having distances between the protruding portions of 20 μm or less.

When the exposed portion of another domain is present in a region at a spatial distance of 20 μm or less from the portion of one protruding domain exposed in the pore, discharge easily occurs between those exposed portions.

When the length of the electroconductive layer in its longitudinal direction is represented by L, and the thickness of the electroconductive layer is represented by T, cross-sections of the electroconductive layer in its thickness direction are obtained at the following three sites: the center of the electroconductive layer in its longitudinal direction, and sites at L/4 from both ends of the electroconductive layer toward the center. For each of the resultant cross-sections, a 50 μm square slice is cut out in the form of including the pore wall surface at each of three random sites in a thickness region from the outer surface of the electroconductive layer to a depth of from 0.1 T to 0.9 T toward the support direction. The analysis described above is performed for each of a total of nine slices.

<Electrophotographic Image Forming Apparatus and Process Cartridge>

An electrophotographic image forming apparatus according to one aspect of the present disclosure includes: an electrophotographic photosensitive member; a transfer member arranged in abutment with the electrophotographic photosensitive member; a charging member arranged in abutment with the electrophotographic photosensitive member; and a developing member arranged in abutment with the electrophotographic photosensitive member.

Now, an example of the electrophotographic image forming apparatus in which the above-mentioned electrophotographic electroconductive member is applied as the transfer member is described in detail below.

Figure 4:
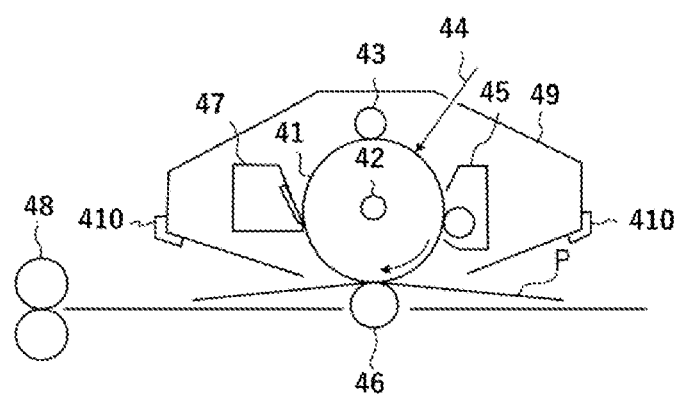
FIG. 4 is a schematic view of an electrophotographic image forming apparatus and a process cartridge.

FIG. 4 is a schematic configuration view of an electrophotographic image forming apparatus according to one aspect of the present disclosure.

In FIG. 4, an electrophotographic photosensitive member 41 of a cylindrical shape is rotationally driven about a shaft 42 in an arrow direction (clockwise direction) at a predetermined peripheral speed. The surface of the electrophotographic photosensitive member 41 being rotationally driven is uniformly charged to a predetermined positive or negative potential by a charging member 43 such as a charging roller in the process of rotation. Then, the charged surface of the electrophotographic photosensitive member 41 receives exposure light 44, which is output from exposing means (not shown), such as slit exposure or laser beam scanning exposure, and whose intensity has been modulated in correspondence with a time-series electric digital image signal of information on a target image. In this manner, electrostatic latent images corresponding to the target image are sequentially formed on the surface of the electrophotographic photosensitive member 41.

The electrostatic latent images formed on the surface of the electrophotographic photosensitive member 41 are developed into toner images by normal development or reversal development with a toner contained in the developer of a developing member 45. Then, the toner images formed and borne on the surface of the electrophotographic photosensitive member 41 are sequentially transferred onto a transfer material P such as paper by a transfer bias from a transfer roller that is a transfer member 46 including the above-mentioned electrophotographic electroconductive member. The transfer material P is taken out of a transfer material-supplying member (not shown) in synchronization with the rotation of the electrophotographic photosensitive member 41, and is fed to a space (abutting portion) between the electrophotographic photosensitive member 41 and the transfer member 46. In addition, a bias voltage opposite in polarity to the charge held by the toner is applied to the transfer member 46 from a bias power source (not shown).

The transfer material P onto which the toner images have been transferred is separated from the surface of the electrophotographic photosensitive member 41, is conveyed into a fixing member 48, and is subjected to treatment for fixing the toner images to be conveyed as an image-formed product (a print or a copy) to the outside of the apparatus.

The surface of the electrophotographic photosensitive member 41 after the transfer of the toner images is subjected to the removal of a transfer residual developer (transfer residual toner) by a cleaning member 47 such as a cleaning blade to be turned into a clean surface. A cleaner-less system configured to directly remove the transfer residual toner with a developing device or the like is also applicable.

Then, the electrophotographic photosensitive member 41 is subjected to electricity-removing treatment with pre-exposure light (not shown) from pre-exposing means (not shown), and then repeatedly used in image formation. When the charging member 43 is a contact charging member using a charging roller or the like as illustrated in FIG. 4, pre-exposure is not necessarily required.

Components, including at least the electrophotographic photosensitive member 41, selected from the above-mentioned components, such as the electrophotographic photosensitive member 41, the charging member 43, the developing member 45, and the cleaning member 47, may be stored in a container and integrally supported to form a process cartridge. In addition, the process cartridge may be detachably attachable to the main body of the electrophotographic image forming apparatus, such as a copying machine or a laser beam printer. In FIG. 4, the electrophotographic photosensitive member 41 is integrally supported with the charging member 43, the developing member 45, and the cleaning member 47 to form a cartridge. In addition, a process cartridge 49 is made detachably attachable to the main body of the electrophotographic image forming apparatus through use of a guiding member 410 such as a rail of the main body of the electrophotographic image forming apparatus. The electrophotographic image forming apparatus illustrated in FIG. 4 includes the cleaning member 47 and the fixing member 48, but these members do not necessarily need to be arranged.

In addition, the process cartridge may include the electrophotographic electroconductive member according to the present disclosure as a charging roller.

According to one aspect of the present disclosure, the electrophotographic electroconductive member that is suppressed from undergoing an increase in hardness even when used in the formation of an electrophotographic image over a long period of time under a state in which an applied voltage is increased can be obtained. In addition, according to another aspect of the present disclosure, the process cartridge conducive to stable formation of a high-quality electrophotographic image can be obtained. Further, according to another aspect of the present disclosure, the electrophotographic image forming apparatus capable of stably forming a high-quality electrophotographic image can be obtained.

EXAMPLES

The electrophotographic electroconductive member, the process cartridge, and the electrophotographic image forming apparatus of the present disclosure are specifically described in detail below, but the technical scope of the present disclosure is not limited thereto.

Tables 1-1 to 1-6 show materials used in Examples and Comparative Examples of the present disclosure.

TABLE 1-1

Rubber Material

| Material abbreviation | Material name | Product name | Manufacturer name | Mooney viscosity ML(1 + 4) 100° C. |
|---|---|---|---|---|
| SBR | Styrene-butadiene rubber | TUFDENE 2003 | Asahi Kasei Corporation | 33 |
| NBR | Acrylonitrile-butadiene rubber | NBR N230SV | JSR Corporation | 32 |
| BR | Polybutadiene rubber | BR 150B | Ube Industries, Ltd. | 40 |
| EPDM | Ethylene-propylene-diene rubber | Esprene 505A | Sumitomo Chemical Co., Ltd. | 47 |
| ECO | Epichlorohydrin rubber | EPICHLOMER CG103 | Osaka Soda Co., Ltd. | 64 |

TABLE 1-2

Electroconductive Particles

| Material abbreviation | Material name | Product name | Manufacturer name | DBP oil absorption (cm³/100 g) |
|---|---|---|---|---|
| #7360 | Carbon black | TOKABLACK #7360SB | Tokai Carbon Co., Ltd. | 87 |
| #7270 | Carbon black | TOKABLACK #7270SB | Tokai Carbon Co., Ltd. | 62 |
| #5500 | Carbon black | TOKABLACK #5500 | Tokai Carbon Co., Ltd. | 155 |
| #45L | Carbon black | #45L | Mitsubishi Chemical Corporation | 45 |
| Ketjen | Carbon black | EC600JD | Ketjen Black International Company | 495 |

TABLE 1-3

Filler

| Material abbreviation | Material name | Product name | Manufacturer name |
|---|---|---|---|
| #30 | Calcium carbonate | NANOX#30 | Maruo Calcium Co., Ltd. |
| AQ | Silica | Nipsil AQ | Tosoh Corporation |

TABLE 1-4

Vulcanization Accelerator Aid and Processing Aid

| Material name | Product name | Manufacturer name |
|---|---|---|
| Zinc oxide | Zinc oxide No. 2 | Sakai Chemical Industry Co., Ltd. |
| Zinc stearate | SZ-2000 | Sakai Chemical Industry Co., Ltd. |

TABLE 1-5

Foaming Agent

| Material abbreviation | Material name | Product name | Manufacturer name | Gas generation amount (ml/g) |
|---|---|---|---|---|
| SB#51 | 4,4'-Oxybis(benzenesulfonylhydrazide) | Neocellborn SB#51 | Eiwa Chemical Ind. Co., Ltd. | 70 |
| N#1000M | 4,4'-Oxybis(benzenesulfonylhydrazide) | Neocellborn N#1000M | Eiwa Chemical Ind. Co., Ltd. | 125 |

TABLE 1-6

Vulcanizing Agent and Vulcanization Accelerator

| Material abbreviation | Material name | Product name | Manufacturer name |
|---|---|---|---|
| Sulfur | Sulfur | SULFAX PMC | Tsurumi Chemical Industry Co., Ltd. |
| DM-P | Dibenzothiazyl disulfide | Nocceler DM-P | Ouchi Shinko Chemical Industrial Co., Ltd. |
| TET-G | Tetraethylthiuram disulfide | Nocceler TET-G | Ouchi Shinko Chemical Industrial Co., Ltd. |

Example 1

<Preparation of Rubber Composition for Electrophotographic Electroconductive Member Formation>

[1-1. Preparation of Rubber Composition for Domain Formation]

Respective materials of the kinds and amounts shown below were mixed with a pressure kneader to obtain a rubber composition for domain formation. Mixing conditions were set to a loading ratio of 70 vol %, a blade rotation speed of 30 rpm, and 16 minutes.

<Rubber Composition for Domain Formation>

| | |
|---|---|
| NBR (product name: JSR NBR N230SV, manufactured by JSR Corporation) | 100 parts by mass |
| Carbon black (product name: TOKABLACK #7360SB, Tokai Carbon Co., Ltd.) | 70 parts by mass |
| Zinc oxide (Zinc oxide No. 2, Sakai Chemical Industry Co., Ltd.) | 5 parts by mass |
| Zinc stearate (product name: SZ-2000, manufactured by Sakai Chemical Industry Co., Ltd.) | 1 part by mass |

[1-2. Preparation of Rubber Composition for Matrix Formation]

Respective materials of the kinds and amounts shown below were mixed with a pressure kneader to obtain a rubber composition for matrix formation. Mixing conditions were set to a loading ratio of 70 vol %, a blade rotation speed of 30 rpm, and 16 minutes.

<Rubber Composition for Matrix Formation>

| | |
|---|---|
| SBR (product name: TUFDENE 2003, manufactured by Asahi Kasei Corporation) | 100 parts by mass |
| Calcium carbonate (product name: NANOX#30, manufactured by Maruo Calcium Co., Ltd.) | 40 parts by mass |
| Zinc oxide (Zinc oxide No. 2, Sakai Chemical Industry Co., Ltd.) | 5 parts by mass |
| Zinc stearate (product name: SZ-2000, manufactured by Sakai Chemical Industry Co., Ltd.) | 1 part by mass |

[1-3. Preparation of Rubber Composition for Electrophotographic Electroconductive Member Formation]

Respective materials of the kinds and amounts shown below were mixed to prepare a rubber composition for electrophotographic electroconductive member formation.

First, 22 parts by mass of the rubber composition for domain formation and 78 parts by mass of the rubber composition for matrix formation were mixed using a pressure kneader. Mixing conditions were set to a loading ratio of 70 vol %, a blade rotation speed of 30 rpm, and 16 minutes.

Next, the materials mixed using the pressure kneader and other materials were mixed with an open roll to prepare a rubber composition for electrophotographic electroconductive member formation. As a mixer, an open roll having a roll diameter of 12 inches (0.30 m) was used. The mixing was performed under the following conditions: the mixture was bilaterally cut 20 times in total at a front roll rotation speed of 10 rpm, a back roll rotation speed of 8 rpm, and a roll gap of 2 mm, and was then subjected to tight milling 10 times at a roll gap of 0.5 mm.

<Rubber Composition for Electrophotographic Electroconductive Member Formation>

| | |
|---|---|
| Rubber composition for domain formation | 22 parts by mass |
| Rubber composition for matrix formation | 78 parts by mass |
| 4,4'-Oxybis(benzenesulfonylhydrazide) (product name: Neocellborn N#1000M, manufactured by Eiwa Chemical Ind. Co., Ltd.) | 5 parts by mass |
| Dibenzothiazyl disulfide (product name: Nocceler DM-P, manufactured by Ouchi Shinko Chemical Industrial Co., Ltd.) | 1.5 parts by mass |
| Tetraethylthiuram disulfide (product name: Nocceler TET-G, manufactured by Ouchi Shinko Chemical Industrial Co., Ltd.) | 2.0 parts by mass |
| Sulfur (product name: SULFAX PMC, manufactured by Tsurumi Chemical Industry Co., Ltd.) | 3.0 parts by mass |

<Production of Electrophotographic Electroconductive Member>

The unvulcanized rubber composition was extruded into a tube shape with a 60 mm vented rubber extruder (manufactured by Mitsuba Mfg. Co., Ltd.). Next, the resultant was vulcanized and foamed with a vulcanizer (manufactured by Micro Denshi Co., Ltd.) including a 3.0 kW microwave vulcanizer to produce a rubber tube. The microwave vulcanizer was set to a frequency of 2,450±50 MHz, an output of 0.8 kW, and an inner furnace temperature of 180° C. After the vulcanization and foaming in the microwave vulcanizer, further vulcanization and foaming were performed using a hot-air vulcanizer set to an inner furnace temperature of 200° C.

The tube after the vulcanization and foaming had an outer diameter of 14.0 mm and an inner diameter of 4.0 mm. The rubber tube was conveyed in each of the microwave vulcanizer and the hot-air vulcanizer by a drawing machine at a speed of 2.0 m/min. The length of the microwave vulcanizer was 4 m, the length of the hot-air vulcanizer was 6 m, and the length of the drawing machine was 1 m. That is, a time period required for passing through the inside of the microwave vulcanizer was 2 minutes, a time period required for passing through the inside of the hot-air vulcanizer was 3 minutes, and a time period required for passing through the inside of the drawing machine was 30 seconds. After the vulcanization and foaming, the rubber tube was cut to a length of 250 mm using a gauge cutter, the electroconductive support 11 having an outer diameter of 5 mm was press-fitted into the rubber tube, and then both end portions were cut to provide a roller having a rubber length of 216 mm. The outer peripheral surface of the roller was ground at a rotation speed of 1,800 RPM and a feeding speed of 800 mm/min so as to have an outer diameter of 12.5 mm. Thus, an electrophotographic electroconductive member having the electroconductive layer 12 having pores on the electroconductive support 11 was produced.

Next, characteristic evaluations are described.

<Measurement of Volume Resistivities of Matrix and Domain>

The volume resistivities of the matrix and the domain according to the present disclosure were each measured with a scanning probe microscope (SPM) (product name: Q-Scope 250, manufactured by Quesant Instrument Corporation) in a contact mode.

First, a thin section having a thickness of about 2 μm was cut out of the electroconductive layer of the electrophotographic electroconductive member using a microtome (product name: Leica EM FCS, manufactured by Leica Microsystems) at a cutting temperature of −100° C. The thin section was cut out of each of the following three sites: the center of the electroconductive layer of the electrophotographic electroconductive member in its longitudinal direction, and sites at L/4 from both ends of the electroconductive layer toward the center, L representing the length of the electroconductive layer in its longitudinal direction. Next, the thin section was set on the surface of a metal plate so that one surface of the thin section corresponding to the cross-section of the electroconductive layer was brought into contact with the surface of the metal plate. Then, a cantilever of the SPM was brought into contact with a portion of the thin section corresponding to a matrix on the surface on an opposite side to the side in contact with the surface of the metal plate. A voltage of 50 V was applied to the cantilever for 5 seconds to measure current values, and an average value thereof for 5 seconds was calculated. Next, the surface shape of the thin section was measured with the SPM, and the thickness of the thin section at the measurement point was determined from the obtained height profile. Further, from the observation result of the surface shape, the area of the depressed portion of the thin section at the contact portion with the cantilever was calculated. The resultant values for the thickness and the depressed portion area were used to calculate the volume resistivity of the matrix. The volume resistivity of each of the domains was calculated in the same manner as described above except that the applied voltage to the cantilever was changed to 1 V.

The measurement was performed at measurement positions of a total of nine sites including three random sites of the matrix portion and the domain portion in the thickness region having a depth of from 0.1 T to 0.9 T from the outer surface of each slice when the thickness of the electroconductive layer was represented by T. The average value thereof was adopted as the volume resistivity of the matrix. The evaluation results are shown in Table 3.

<Measurement of Interdomain Distance>

In order to evaluate a distance between the domains, the following measurement was performed.

A thin section for observation (thickness: 2 μm) was cut out in the same manner as in the measurement of the volume resistivity of the matrix or the domains, and the cutout section was photographed using a scanning electron microscope (SEM) (product name: S-4800, manufactured by Hitachi High-Technologies Corporation) at 5,000 times to provide an observation image. Image processing software (product name: LUZEX, manufactured by Nireco Corporation) was used for the image to provide a binarized image. Then, the distribution of distances between the wall surfaces of the domains was calculated for the binarized image, and then the arithmetic average value of the distribution was calculated.

The measurement of the interdomain distance was performed as described below. A total of nine sites, i.e., three random sites in a thickness region from the outer surface of the electroconductive layer of each of three thin sections obtained from the three measurement sites described above to a depth of from 0.1 T to 0.9 T, T representing the thickness of the electroconductive layer, were selected. A 50 μm square region was extracted as an analysis image and subjected to the measurement, and the arithmetic average value of the nine sites was calculated. The evaluation result is shown in Table 3 as the "interdomain distance" of the matrix.

<Measurement of Porosity>

A razor was applied to the electroconductive layer of the electrophotographic electroconductive member to cut out a 2 mm square slice at each of five points in the longitudinal direction. Next, through use of an X-ray CT inspection apparatus (product name: TX-300, manufactured by Mars Tohken Solution Co., Ltd.), transmission images of the slices were measured at a resolution of 1 μm per pixel, and tomographic images were obtained therefrom to construct a three-dimensional image. The volume of closed pores (cells) was determined from the resultant three-dimensional image, and the ratio of the volume of the pores to the volume of the entirety of the three-dimensional image (porosity (%)) was calculated. The result is shown in Table 3.

<Identification of Domains Protruding into Pore>

A pore wall surface was cut by FIB into a 50 μm square slice in the form of including the pore wall surface. In this case, the slice was cut out so that the area of the pore wall surface therein was 2,500 μm$^2$ or more.

Cross-sections were cut out of the slice by FIB in a direction perpendicular to the pore wall surface at intervals of 10 nm.

Then, all the cross-sections were observed with a SEM at a magnification of from 10K times to 20K times (10,000 times to 20,000 times). Images of the cross-sections were stacked together to form a 50 μm square three-dimensional image. The resultant three-dimensional image was evaluated using analytical software (product name: MATLAB 2015b, manufactured by The MathWorks, Inc.) as described below.

First, the three-dimensional image was binarized using Otsu's method to create a three-dimensional binary image in which a rubber region and a pore region were separated. Further, a three-dimensional binary image separated into a domain region and a matrix+pore region was similarly created. Those images were used to be separated into three regions, i.e., the matrix region, the domain region, and the pore region to create a three-dimensional image in which the domain region, the matrix region, and the pore region were arbitrarily color coded.

Next, from the resultant three-dimensional image, for one domain, a plane obtained by connecting points at each of which the matrix, the domain, and the pore were all brought into contact with each other was subjected to plane approximation by a least-squares method, and the resultant plane was set to be the bottom surface of the domain. When a domain protruded on a pore side with respect to the bottom surface, the domain was defined as a domain protruding into the pore, and a region thereof present on the pore side with respect to the bottom surface was defined as a protruding portion.

Then, from the resultant three-dimensional image, distances between the protruding portions between the domains protruding into the pore (distances to the closest protruding domains) were calculated for all the domains protruding into the pore that were present on the three-dimensional image.

When the length of the electroconductive layer in its longitudinal direction was represented by L, and the thickness of the electroconductive layer was represented by T, cross-sections of the electroconductive layer in its thickness direction were obtained at the following three sites: the center of the electroconductive layer in its longitudinal direction, and sites at L/4 from both ends of the electroconductive layer toward the center. For each of the resultant cross-sections, a 50 μm square slice was cut out in the form of including the pore wall surface as described above at each of three random sites in a thickness region from the outer surface of the electroconductive layer to a depth of from 0.1 T to 0.9 T toward a support direction. The above-mentioned analysis was performed for each of a total of nine slices.

The result is shown in Table 3 in the following manner: another domain is "present" or "absent" at a distance between protruding portions of 20 μm or less when 90% or more, or less than 90%, respectively, of the domains subjected to the measurement are domains having distances between the protruding portions of 20 μm or less.

<Energization Endurance>

Under an environment having a temperature of 30° C. and a relative humidity of 50%, the electrophotographic electroconductive member was placed on a metal drum, a load of 500 g per one side was applied to the electroconductive support at both ends of the electrophotographic electroconductive member to cause the metal drum and the electrophotographic electroconductive member to abut on each other. The metal drum was driven at 10 rpm.

The electrophotographic electroconductive member rotates following the metal drum. A voltage was applied between the electroconductive support and the metal drum, and while the current at this time was controlled so as to be a constant current of 100 μA, energization was performed for 24 hours. This corresponds to 300,000 sheets in the case of using the electrophotographic electroconductive member as a transfer member assuming a monochrome machine at a transfer current of 15 μA and 40 ppm.

<Hardness Measurement>

Under an environment having a temperature of 23° C. and a relative humidity of 50%, an indenter of a rectangular parallelepiped shape made up of 5 mm×5 mm squares was perpendicularly pressed into the electrophotographic electroconductive member by 0.6 mm, and a load (g) at 0.5 mm indentation was measured. The measurement was performed at a total of three points, i.e., the center of the electrophotographic electroconductive member, and sites at L/4 from both end portions of the electrophotographic electroconductive member, L representing the longitudinal length of the electrophotographic electroconductive member, and an average value was adopted as a hardness.

The above-mentioned operation was performed before energization and after 24 hours of energization. After 24 hours of energization, measurement was performed after aging under an environment having a temperature of 23° C. and a relative humidity of 50% for 30 minutes from the end of the energization. A hardness change ratio between before energization and after 24 hours of energization was calculated. The result is shown in Table 3.

Next, image evaluation is described.

<Image Evaluation>

The electrophotographic electroconductive member was incorporated as a transfer roller into a laser beam printer of an electrophotographic system (Laser Jet P1606dn, manufactured by HP), and continuous endurance was performed under an environment having a temperature of 23° C. and a relative humidity of 55%. Image evaluation (solid black) was performed at 200,000 sheets and at 300,000 sheets. The resultant images were each examined for a transfer void by visual observation, and evaluation was performed by the following criteria. The results are shown in Table 3.

(Transfer Void)

Rank A: No transfer void is observed.
Rank B: A transfer void is observed, but is extremely slight.
Rank C: A transfer void is observed, but is acceptable for practical use.
Rank D: A transfer void is remarkable, and is unacceptable for practical use.

Example 2 to Example 20

A rubber composition for matrix formation and a rubber composition for domain formation according to each of Examples 2 to 20 were prepared in accordance with formulations shown in Table 2-1 in the same manner as in Example 1. Then, a rubber composition for electrophotographic electroconductive member formation according to each Example was prepared using the rubber composition for matrix formation and the rubber composition for domain formation according to each Example in accordance with a formulation shown in Table 2-2 in the same manner as in Example 1.

Electrophotographic electroconductive members 2 to 20 according to respective Examples were produced in the same manner as in Example 1 except that those rubber compositions for electrophotographic electroconductive member formation were used. The electrophotographic electroconductive members according to Examples 2 to 20 were each subjected to measurement and evaluation in the same manner as in Example 1. The obtained results are shown in Table 3.

TABLE 2-1

| | Rubber composition for matrix formation | | | | | | Rubber composition for domain formation | |
|---|---|---|---|---|---|---|---|---|
| | First rubber | | | | Zinc oxide | Zinc stearate | Second rubber | |
| | | Mooney | Filler | | | | | Mooney |
| Example | Kind of rubber | viscosity (M) | Kind | Number of parts | Number of parts | Number of parts | Rubber kind | viscosity (M) |
| 1 | SBR | 33 | #30 | 40 | 5 | 1 | NBR | 32 |
| 2 | BR | 40 | #30 | 40 | 5 | 1 | NBR | 32 |
| 3 | EPDM | 47 | #30 | 40 | 5 | 1 | NBR | 32 |
| 4 | SBR | 33 | #30 | 40 | 5 | 1 | NBR | 32 |
| 5 | SBR | 33 | #30 | 40 | 5 | 1 | NBR | 32 |

TABLE 2-1-continued

| | | | | | | | | |
|---|---|---|---|---|---|---|---|---|
| 6 | SBR | 33 | #30 | 40 | 5 | 1 | BR | 40 |
| 7 | SBR | 33 | #30 | 40 | 5 | 1 | NBR | 32 |
| 8 | SBR | 33 | #30 | 40 | 5 | 1 | NBR | 32 |
| 9 | SBR | 33 | #30 | 40 | 5 | 1 | NBR | 32 |
| 10 | SBR | 33 | #30 | 40 | 5 | 1 | BR | 40 |
| 11 | SBR | 33 | #30 | 40 | 5 | 1 | NBR | 32 |
| 12 | SBR | 33 | #30 | 40 | 5 | 1 | NBR | 32 |
| 13 | SBR | 33 | #30 | 40 | 5 | 1 | ECO | 64 |
| 14 | SBR | 33 | #30 | 40 | 5 | 1 | BR | 40 |
| 15 | SBR | 33 | #30 | 40 | 5 | 1 | NBR | 32 |
| 16 | SBR | 33 | #30 | 40 | 5 | 1 | BR | 40 |
| 17 | SBR | 33 | #30 | 40 | 5 | 1 | NBR | 32 |
| 18 | SBR | 33 | #30 | 60 | 5 | 1 | NBR | 32 |
| 19 | SBR | 33 | #30 | 40 | 5 | 1 | NBR | 32 |
| 20 | SBR | 33 | #30 | 40 | 5 | 1 | NBR | 32 |

| | Rubber composition for domain formation | | | | | Zinc oxide | Zinc stearate |
|---|---|---|---|---|---|---|---|
| | Electroconductive particles | | | Filler | | | |
| Example | Kind | DBP absorption (mL/100 g) | Number of parts | Kind | Number of parts | Number of parts | Number of parts |
| 1 | #7360 | 87 | 70 | — | — | 5 | 1 |
| 2 | #7360 | 87 | 70 | — | — | 5 | 1 |
| 3 | #7360 | 87 | 70 | — | — | 5 | 1 |
| 4 | #7360 | 87 | 70 | — | — | 5 | 1 |
| 5 | #7360 | 87 | 70 | — | — | 5 | 1 |
| 6 | #45L | 45 | 60 | — | — | 5 | 1 |
| 7 | #7360 | 87 | 70 | — | — | 5 | 1 |
| 8 | #7360 | 87 | 70 | — | — | 5 | 1 |
| 9 | #7360 | 87 | 70 | — | — | 5 | 1 |
| 10 | #7360 | 87 | 70 | — | — | 5 | 1 |
| 11 | #7270 | 62 | 60 | — | — | 5 | 1 |
| 12 | #7360 | 87 | 80 | — | — | 5 | 1 |
| 13 | #5500 | 155 | 70 | — | — | 5 | 1 |
| 14 | #7270 | 62 | 60 | — | — | 5 | 1 |
| 15 | #7360 | 87 | 70 | — | — | 5 | 1 |
| 16 | #7270 | 62 | 60 | — | — | 5 | 1 |
| 17 | #7360 | 87 | 90 | — | — | 5 | 1 |
| 18 | #7270 | 62 | 60 | — | — | 5 | 1 |
| 19 | #7360 | 87 | 50 | #30 | 20 | 5 | 1 |
| 20 | #7360 | 87 | 50 | AQ | 20 | 5 | 1 |

TABLE 2-2

| | Rubber composition for electrophotographic electroconductive member formation | | | | | | |
|---|---|---|---|---|---|---|---|
| | Rubber composition for matrix formation | Rubber composition for domain formation | Foaming agent | | Sulfur | DM-P | TET-G |
| Example | Parts | Parts | Kind | Number of parts | Number of parts | Number of parts | Number of parts |
| 1 | 78 | 22 | N#1000M | 5 | 3 | 1.5 | 2 |
| 2 | 78 | 22 | N#1000M | 5 | 3 | 1.5 | 2 |
| 3 | 78 | 22 | N#1000M | 5 | 3 | 1.5 | 2 |
| 4 | 85 | 15 | N#1000M | 5 | 3 | 1.5 | 2 |
| 5 | 74 | 26 | N#1000M | 5 | 3 | 1.5 | 2 |
| 6 | 74 | 26 | N#1000M | 5 | 3 | 1.5 | 2 |
| 7 | 72 | 28 | N#1000M | 5 | 3 | 1.5 | 2 |
| 8 | 72 | 28 | N#1000M | 10 | 3 | 1.5 | 2 |
| 9 | 72 | 28 | N#1000M | 2 | 3 | 1.5 | 2 |
| 10 | 72 | 28 | N#1000M | 12 | 3 | 1.5 | 2 |
| 11 | 72 | 28 | N#1000M | 12 | 3 | 1.5 | 2 |

TABLE 2-2-continued

Rubber composition for electrophotographic electroconductive member formation

| Example | Rubber composition for matrix formation Parts | Rubber composition for domain formation Parts | Foaming agent Kind | Foaming agent Number of parts | Sulfur Number of parts | DM-P Number of parts | TET-G Number of parts |
|---|---|---|---|---|---|---|---|
| 12 | 72 | 28 | N#1000M | 12 | 3 | 1.5 | 2 |
| 13 | 78 | 22 | N#1000M | 5 | 3 | 1.5 | 2 |
| 14 | 78 | 22 | N#1000M | 5 | 3 | 1.5 | 2 |
| 15 | 85 | 15 | N#1000M | 1 | 3 | 1.5 | 2 |
| 16 | 87 | 13 | N#1000M | 1 | 3 | 1.5 | 2 |
| 17 | 78 | 22 | N#1000M | 5 | 3 | 1.5 | 2 |
| 18 | 87 | 13 | N#1000M | 5 | 3 | 1.5 | 2 |
| 19 | 78 | 22 | N#1000M | 5 | 3 | 1.5 | 2 |
| 20 | 78 | 22 | N#1000M | 5 | 3 | 1.5 | 2 |

TABLE 3

Characteristic evaluation

| Example | Presence or absence of domains protruding into pore | Presence or absence of other domain at distance between protruding portions of 20 μm or less | Matrix volume resistivity Ωcm | Domain volume resistivity Ωcm | Porosity % | Interdomain distance μm | Hardness change ratio % | Image evaluation 200k | Image evaluation 300k |
|---|---|---|---|---|---|---|---|---|---|
| 1 | Present | Present | 8.3E+13 | 2.0E+01 | 70 | 1.2 | 1 | A | A |
| 2 | Present | Present | 3.1E+15 | 2.2E+01 | 67 | 1 | 1 | A | A |
| 3 | Present | Present | 2.1E+16 | 2.9E+01 | 64 | 0.8 | 0 | A | A |
| 4 | Present | Present | 8.3E+13 | 1.8E+01 | 81 | 4.3 | 2 | A | A |
| 5 | Present | Present | 8.5E+13 | 3.2E+01 | 54 | 0.3 | 1 | A | A |
| 6 | Present | Present | 8.3E+13 | 1.8E+09 | 62 | 0.5 | 7 | B | C |
| 7 | Present | Present | 8.2E+13 | 3.2E+01 | 53 | 0.2 | 3 | A | B |
| 8 | Present | Present | 8.4E+13 | 4.0E+01 | 87 | 0.2 | 4 | A | B |
| 9 | Present | Present | 8.3E+13 | 2.8E+01 | 33 | 0.2 | 3 | A | B |
| 10 | Present | Present | 8.3E+13 | 5.1E+02 | 91 | 0.2 | 6 | B | C |
| 11 | Present | Present | 8.3E+13 | 5.5E+03 | 92 | 0.2 | 5 | B | B |
| 12 | Present | Present | 8.1E+13 | 2.0E+01 | 91 | 0.2 | 6 | B | C |
| 13 | Present | Present | 8.2E+13 | 3.6E+00 | 74 | 0.8 | 3 | A | B |
| 14 | Present | Present | 8.3E+13 | 4.5E+04 | 67 | 1.2 | 6 | B | C |
| 15 | Present | Present | 8.3E+13 | 2.0E+01 | 27 | 4.2 | 7 | B | C |
| 16 | Present | Absent | 8.1E+13 | 5.2E+04 | 29 | 5.1 | 8 | B | C |
| 17 | Present | Present | 8.4E+13 | 1.2E+01 | 66 | 1.1 | 0 | A | A |
| 18 | Present | Absent | 8.3E+13 | 9.8E+03 | 71 | 4 | 5 | B | B |
| 19 | Present | Present | 8.3E+13 | 4.2E+03 | 72 | 1.1 | 1 | A | A |
| 20 | Present | Present | 8.4E+13 | 4.4E+03 | 74 | 1.2 | 1 | A | A |

Example 21

A rubber composition for matrix formation and a rubber composition for domain formation were prepared in accordance with formulations shown in Table 4-1 in the same manner as in Example 1. Then, a rubber composition for electrophotographic electroconductive member formation according to this Example was prepared using the resultant rubber composition for matrix formation and rubber composition for domain formation in accordance with a formulation shown in Table 4-2 in the same manner as in Example 1.

An electrophotographic electroconductive member 21 was produced in the same manner as in Example 1 except that the rubber composition for electrophotographic electroconductive member formation was used. The electrophotographic electroconductive member according to this Example was subjected to measurement and evaluation in the same manner as in Example 1. The obtained results are shown in Table 5.

In this Example, a foaming agent having a smaller generated gas amount than the foaming agent used in Examples 1 to 20 was selected in order to reduce surface roughness from the viewpoint of discharge uniformity required as a charging member. Consequently, pore sizes were reduced, and hence the surface roughness was able to be reduced.

TABLE 4-1

|  |  |  | Example 21 |
| --- | --- | --- | --- |
| Rubber composition for matrix formation | First rubber | Kind of rubber | SBR |
|  |  | Mooney viscosity (M) | 33 |
|  | Filler | Kind | #30 |
|  |  | Number of parts | 40 |
|  | Zinc oxide | Number of parts | 5 |
|  | Zinc stearate | Number of parts | 1 |
| Rubber composition for domain formation | Second rubber | Kind of rubber | NBR |
|  |  | Mooney viscosity (M) | 32 |
|  | Electroconductive particles | Kind | #7360 |
|  |  | DBP oil absorption (mL/100 g) | 87 |
|  |  | Number of parts | 70 |
|  | Zinc oxide | Number of parts | 5 |
|  | Zinc stearate | Number of parts | 1 |

TABLE 4-2

| | Rubber composition for electrophotographic electroconductive member formation | | | | | |
| --- | --- | --- | --- | --- | --- | --- |
| | Rubber composition for matrix formation Parts | Rubber composition for domain formation Parts | Foaming agent | Sulfur | DM-P | TET-G |
| | | | Kind | Number of parts | Number of parts | Number of parts | Number of parts |
| Example 21 | 78 | 22 | SB#51 | 5 | 3 | 1.5 | 2 |

Image evaluation is described.

The electrophotographic electroconductive member according to Example 21 was incorporated as a charging roller into the process cartridge of a laser beam printer of an electrophotographic system (product name: Laser Jet P1606dn, manufactured by HP). The process cartridge was mounted onto the laser printer, and the formation of an electrophotographic image was performed under an environment having a temperature of 23° C. and a relative humidity of 55%. At each of the time points when the number of printed sheets reached 200,000 sheets and 300,000 sheets, a halftone image was output on one sheet. The resultant two halftone images were visually observed, and the presence or absence and degree of a horizontal streak due to a charging failure were evaluated by the following criteria. The results are shown in Table 5.

(Charging Horizontal Streak)
Rank A: No charging horizontal streak is observed.
Rank B: An extremely slight charging horizontal streak is observed.
Rank C: A charging horizontal streak is observed.
Rank D: A charging horizontal streak is remarkably observed.

Comparative Examples 1 to 3

A rubber composition for matrix formation and a rubber composition for domain formation according to each of Comparative Examples 1 to 3 were prepared in accordance with formulations shown in Table 6-1 in the same manner as in Example 1. Then, a rubber composition for electrophotographic electroconductive member formation according to each Comparative Example was prepared using the rubber composition for matrix formation and the rubber composition for domain formation according to each Comparative Example in accordance with a formulation shown in Table 6-2 in the same manner as in Example 1.

Electrophotographic electroconductive members according to Comparative Examples 1 to 3 were produced in the same manner as in Example 1 except that those rubber compositions for electrophotographic electroconductive member formation were used. The resultant electrophotographic electroconductive members were each subjected to measurement and evaluation in the same manner as in Example 1. The obtained results are shown in Table 7.

TABLE 5

| | Characteristic evaluation | | | | | | | | |
| --- | --- | --- | --- | --- | --- | --- | --- | --- | --- |
| | Presence or absence of domains protruding into pore | Presence or absence of other domain at distance between protruding portions of 20 μm or less | Matrix volume resistivity $\Omega \cdot cm$ | Domain volume resistivity $\Omega \cdot cm$ | Porosity % | Interdomain distance μm | Hardness change ratio % | Image evaluation | |
| Example | | | | | | | | 200k | 300k |
| 21 | Present | Present | 8.3E+13 | 2.0E+01 | 32 | 1.2 | 2 | A | A |

TABLE 6-1

|  |  |  | Comparative Example 1 | Comparative Example 2 | Comparative Example 3 |
|---|---|---|---|---|---|
| Rubber composition for matrix formation | First rubber | Kind of rubber | SBR | NBR | ECO |
|  |  | Mooney viscosity (M) | 33 | 32 | 64 |
|  | Filler | Kind | #30 | #30 | #30 |
|  |  | Number of parts | 40 | 40 | 40 |
|  | Zinc oxide | Number of parts | 5 | 5 | 5 |
|  | Zinc stearate | Number of parts | 1 | 1 | 1 |
| Rubber composition for domain formation | Second rubber | Kind of rubber | ECO | SBR | EPDM |
|  |  | Mooney viscosity (M) | 64 | 33 | 47 |
|  | Electroconductive particles | Kind | — | #7360 | Ketjen |
|  |  | DBP absorption (mL/100 g) | — | 87 | 495 |
|  |  | Number of parts | — | 70 | 10 |
|  | Filler | Kind | — | — | — |
|  |  | Number of parts | — | — | — |
|  | Zinc oxide | Number of parts | 5 | 5 | 5 |
|  | Zinc stearate | Number of parts | 1 | 1 | 1 |

TABLE 6-2

Rubber composition for electrophotographic electroconductive member formation

|  | Rubber composition for matrix formation Parts | Rubber composition for domain formation Parts | Foaming agent Kind | Foaming agent Number of parts | Sulfur Number of parts | DM-P Number of parts | TET-G Number of parts |
|---|---|---|---|---|---|---|---|
| Comparative Example 1 | 78 | 22 | N#1000M | 5 | 3 | 1.5 | 2 |
| Comparative Example 2 | 78 | 22 | N#1000M | 5 | 3 | 1.5 | 2 |
| Comparative Example 3 | 70 | 30 | — | — | 3 | 1.5 | 2 |

TABLE 7

Characteristic evaluation

|  | Presence or absence of domains protruding into pore | Presence or absence of other domain at distance between protruding portions of 20 μm or less | Matrix volume resistivity Ωcm | Domain volume resistivity Ωcm | Porosity % | Interdomain distance μm | Hardness change ratio % | Image evaluation 200k | Image evaluation 300k |
|---|---|---|---|---|---|---|---|---|---|
| Comparative Example 1 | Absent | Absent | 8.3E+13 | 3.0E+08 | 71 | 1.3 | 16 | D | D |
| Comparative Example 2 | Present | Present | 7.4E+10 | 5.8E+01 | 72 | 1.4 | 17 | D | D |
| Comparative Example 3 | Absent | Absent | 3.0E+08 | 4.5E+03 | — | 1.2 | 14 | C | D |

The present disclosure is not limited to the embodiments described above, and various changes and modifications may be made without departing from the spirit and scope of the present disclosure. The following claims are appended hereto in order to make the scope of the present disclosure public.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electrophotographic electroconductive member, comprising:
    a support having an electroconductive outer surface; and
    an electroconductive layer on the outer surface of the support;
    the electroconductive layer comprising a matrix containing a crosslinked product of a first rubber, and domains dispersed in the matrix;

the domains each comprising a crosslinked product of a second rubber, and electroconductive particles;

the matrix having a volume resistivity R1 of more than $1.0 \times 10^{12}$ Ω·cm, and the domains each having a volume resistivity R2 lower than the volume resistivity R1 of the matrix, wherein the electroconductive layer further comprises a pore, an inner wall of the pore being constituted by a part of the matrix and a part of the domains, and the domains constituting the inner wall protrude into the pore at sites on the inner wall.

2. The electrophotographic electroconductive member according to claim 1, wherein a distance between protruding portions of the domains protruding into the pore is 20 μm or less.

3. The electrophotographic electroconductive member according to claim 1, wherein each of the domains has volume resistivity R2 of $1.0 \times 10^{1}$ to $1.0 \times 10^{4}$ Ω·cm.

4. The electrophotographic electroconductive member according to claim 1, wherein the electroconductive layer has a porosity within a range of 30 to 90%.

5. The electrophotographic electroconductive member according to claim 1, wherein a distance between the domains of the electroconductive layer that are adjacent to each other falls within a range of 0.3 to 5.0 μm.

6. The electrophotographic electroconductive member according to claim 1, wherein the electrophotographic electroconductive member is a transfer member.

7. An electrophotographic image forming apparatus comprising an electrophotographic electroconductive member, the electrophotographic electroconductive member comprising:

a support having an electroconductive outer surface; and an electroconductive layer on the outer surface of the support;

the electroconductive layer comprising a matrix containing a crosslinked product of a first rubber, and domains dispersed in the matrix;

the domains each comprising a crosslinked product of a second rubber, and electroconductive particles;

the matrix having a volume resistivity R1 of more than $1.0 \times 10^{12}$ Ω·cm, and the domains each having a volume resistivity R2 lower than the volume resistivity R1 of the matrix, wherein the electroconductive layer further comprises a pore, an inner wall of the pore being constituted by a part of the matrix and a part of the domains, and the domains constituting the inner wall protrude into the pore at sites on the inner wall.

8. The electrophotographic image forming apparatus according to claim 7, wherein the electrophotographic electroconductive member is a transfer member.

9. An electrophotographic process cartridge, which is detachably attachable to a main body of an electrophotographic image forming apparatus, the process cartridge comprising an electrophotographic electroconductive member, the electrophotographic electroconductive member comprising:

a support having an electroconductive outer surface; and an electroconductive layer on the outer surface of the support;

the electroconductive layer comprising a matrix containing a crosslinked product of a first rubber, and domains dispersed in the matrix;

the domains each comprising a crosslinked product of a second rubber, and electroconductive particles;

the matrix having a volume resistivity R1 of more than $1.0 \times 10^{12}$ Ω·cm, and the domains each having a volume resistivity R2 lower than the volume resistivity R1 of the matrix, wherein the electroconductive layer further comprises a pore, an inner wall of the pore being constituted by a part of the matrix and a part of the domains, and the domains constituting the inner wall protrude into the pore at sites on the inner wall.

\* \* \* \* \*